July 3, 1934.  L. WING  1,965,063
DIRECTION SIGNAL
Filed April 26, 1932   2 Sheets-Sheet 1
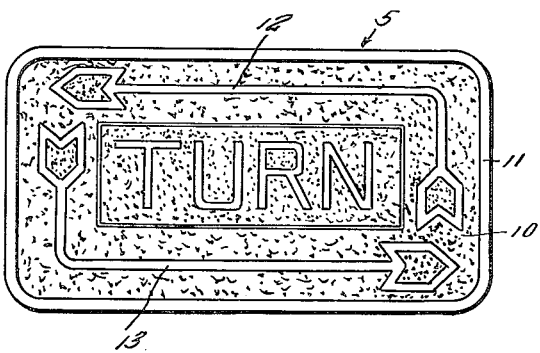
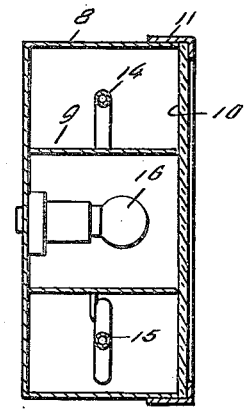
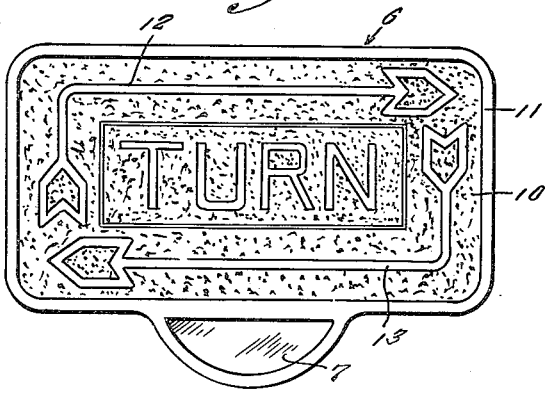
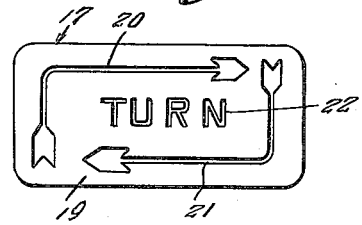
Inventor
Lee Wing
By Clarence A. O'Brien
Attorney July 3, 1934.                L. WING                 1,965,063
                         DIRECTION SIGNAL
               Filed April 26, 1932      2 Sheets-Sheet 2
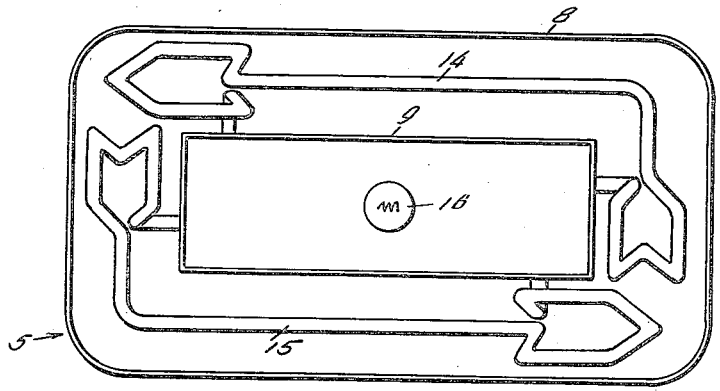
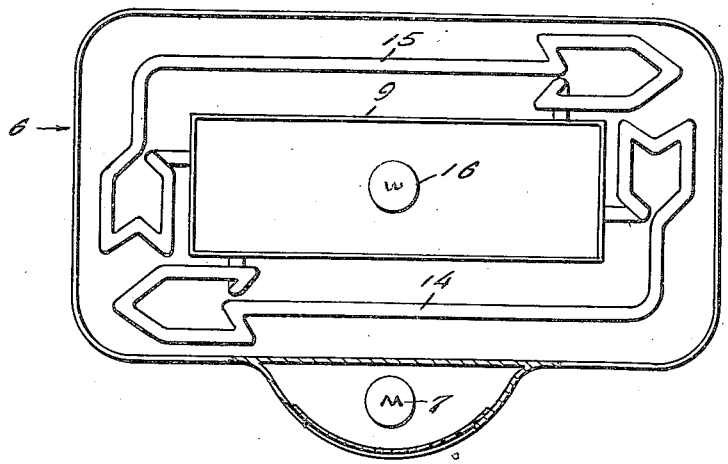
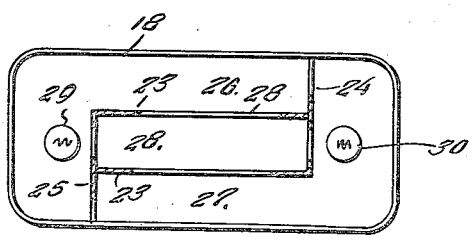
Inventor
Lee Wing
By Clarence A. O'Brien
Attorney Patented July 3, 1934

1,965,063

UNITED STATES PATENT OFFICE 1,965,063

DIRECTION SIGNAL

Lee Wing, Calexico, Calif.

Application April 26, 1932, Serial No. 607,587

2 Claims. (Cl. 177—327)

This invention relates to new and useful improvements in direction signals for use on automobiles and other land vehicles.

The principal object of this invention is to provide a direction signal wherein the several characters are so mounted and constructed as to afford clearness and attractiveness in exhibition not found in signals of this kind, now on the market.

Other important objects and advantages of the invention will become apparent to the reader of the following specification.

In the drawings:—

Figure 1 represents a front elevational view of the front signal box.

Fig. 2 represents a front elevational view of the rear signal box.

Fig. 3 represents a vertical sectional view through the box shown in Fig. 1.

Fig. 4 represents a front elevational view of the lamp box shown in Fig. 1, with the pane removed.

Fig. 5 represents a front elevational view of the signal box shown in Fig. 2, with the pane removed.

Fig. 6 represents a front elevational view of the pilot lamp box.

Fig. 7 represents a fragmentary detailed sectional view through the pilot lamp box.

Referring to the drawings wherein like numerals designate like parts, it can be seen in Fig. 1, that numeral 5 generally refers to the front signal box, while numeral 6 in Fig. 2 generally refers to the rear signal box, both boxes being of the same construction excepting for the tail light.

Each signal box consists of a rectangular shaped casing which as shown in Fig. 4, is provided with a smaller rectangular shaped compartment 9 therein, with the walls of the compartment, spaced from the walls of the first-mentioned casing, both the casing and compartment being open on the same side and having a common frosted or ground pane 10 covering the same, the pane being mounted in a rim 11.

The central portion of the pane 10 has some term such as "Turn" in clear glass letters, while the annular portions around this term is provided with oppositely disposed L-shaped clear glass markings 12 and 13 in the form of arrows coinciding with the neon or gaseous tubes 14 and 15 respectively, which are mounted in the annular space between the casing 9 and the casing 8 and surrounding the said casing 9.

These neon or gaseous tubes 14 and 15 are in the form of oppositely directed arrows. A bulb 16 is provided in the casing 9 for illuminating the "Turn" designation on the pane 10 when either of the neon tubes 14, 15 is energized.

For placement on the dash board of the automobile, a pilot lamp box generally referred to by numeral 17 is provided, the same being provided with a casing 18 having a front cover plate 19 formed with oppositely disposed arrows 20 and 21 corresponding to the arrows 14 and 15 shown in Fig. 4. The word "Turn" generally referred to by numeral 22 is also struck out from the cover 19. The interior of the casing 18 is divided by a pair of horizontally disposed partitions 23—23, the ends of the partitions 23—23 being connected at one end by a partition which extends upwardly in connection with the top of the casing 18 and which is denoted by numeral 24. The remaining ends of the partitions 23—23 are connected by the vertical partition 25 which extends downwardly to connect to the lower portion of the casing 18. Thus two L-shaped compartments 26—27 are provided between which is the compartment 28 defined by the partitions 23—23 which are provided with slots 28 therein through which light from the lamps 29—30 in the compartments 26—27 can penetrate.

While the foregoing specification sets forth the invention in specfic terms, it is to be understood that numerous changes in the shape, size and materials may be resorted to without departing from the spirit and scope of the invention as claimed hereinafter.

Having thus described my invention, what I claim as new is:—

1. A signal comprising a substantially rectangular shaped casing open on one side thereof, a substantially rectangular compartment centrally disposed in said casing and spaced from the side, bottom and top walls of the casing to form an annular space therearound, means cooperating with the central compartment to display the indicia Turn, and means cooperating with said annular space to selectively display either of a pair of L-shaped indicating arrows, said arrows together surrounding the central compartment with the heads of the arrows being located in diagonally opposite corners of the casing and being directed in opposite directions.

2. A signal comprising a substantially rectangular shaped casing open on one side thereof, a rectangular shaped compartment centrally disposed in said casing and spaced from the top, side and bottom walls of the casing defining an annular space therearound, means cooperating with the central compartment to display the indicia Turn, and a pair of neon tubes in the form of L-shaped arrows, in said annular space and surrounding said central compartment, the heads of said arrows being located in diagonally opposite corners of said casing and being directed in opposite directions.

LEE WING.